Patented Aug. 12, 1930

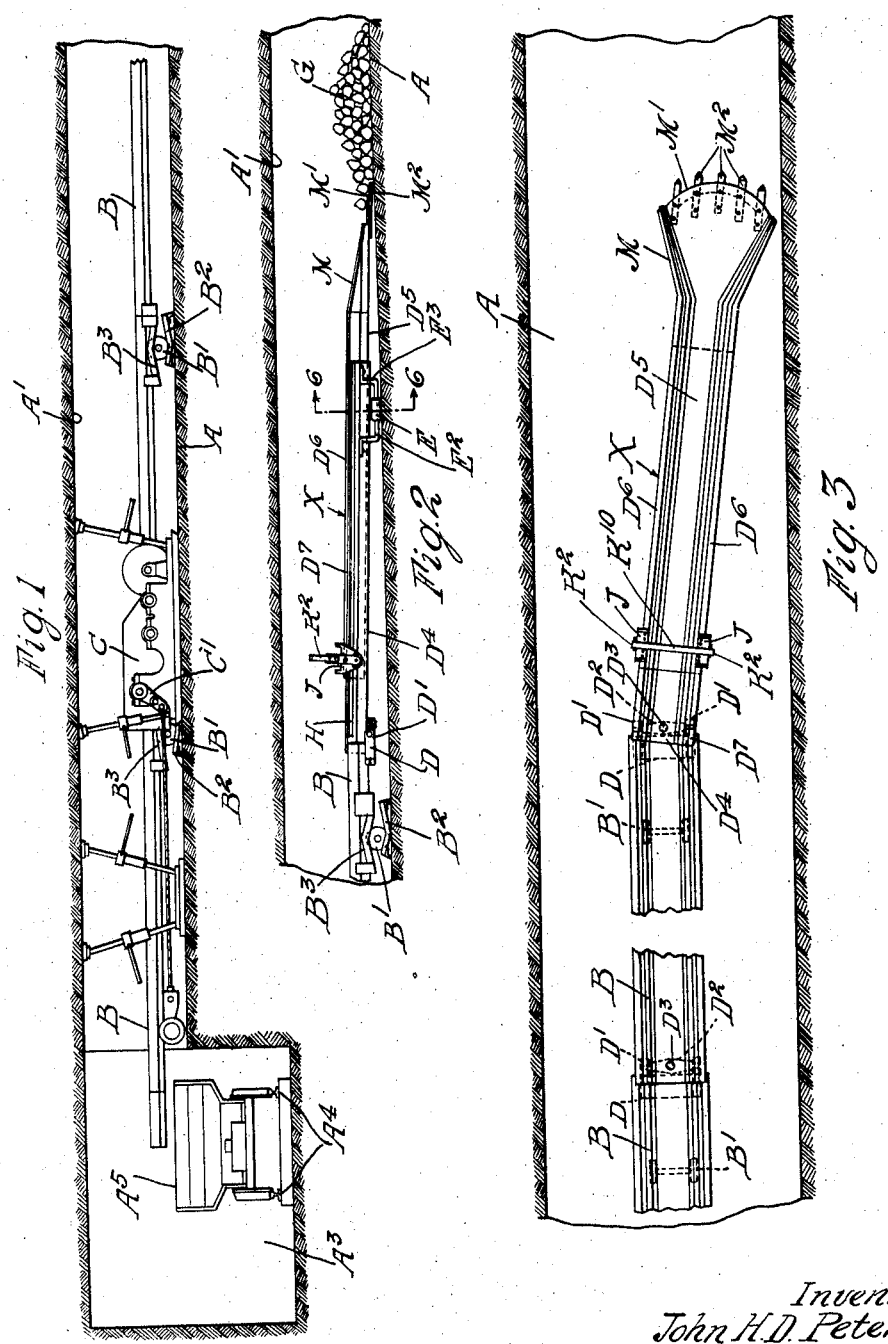

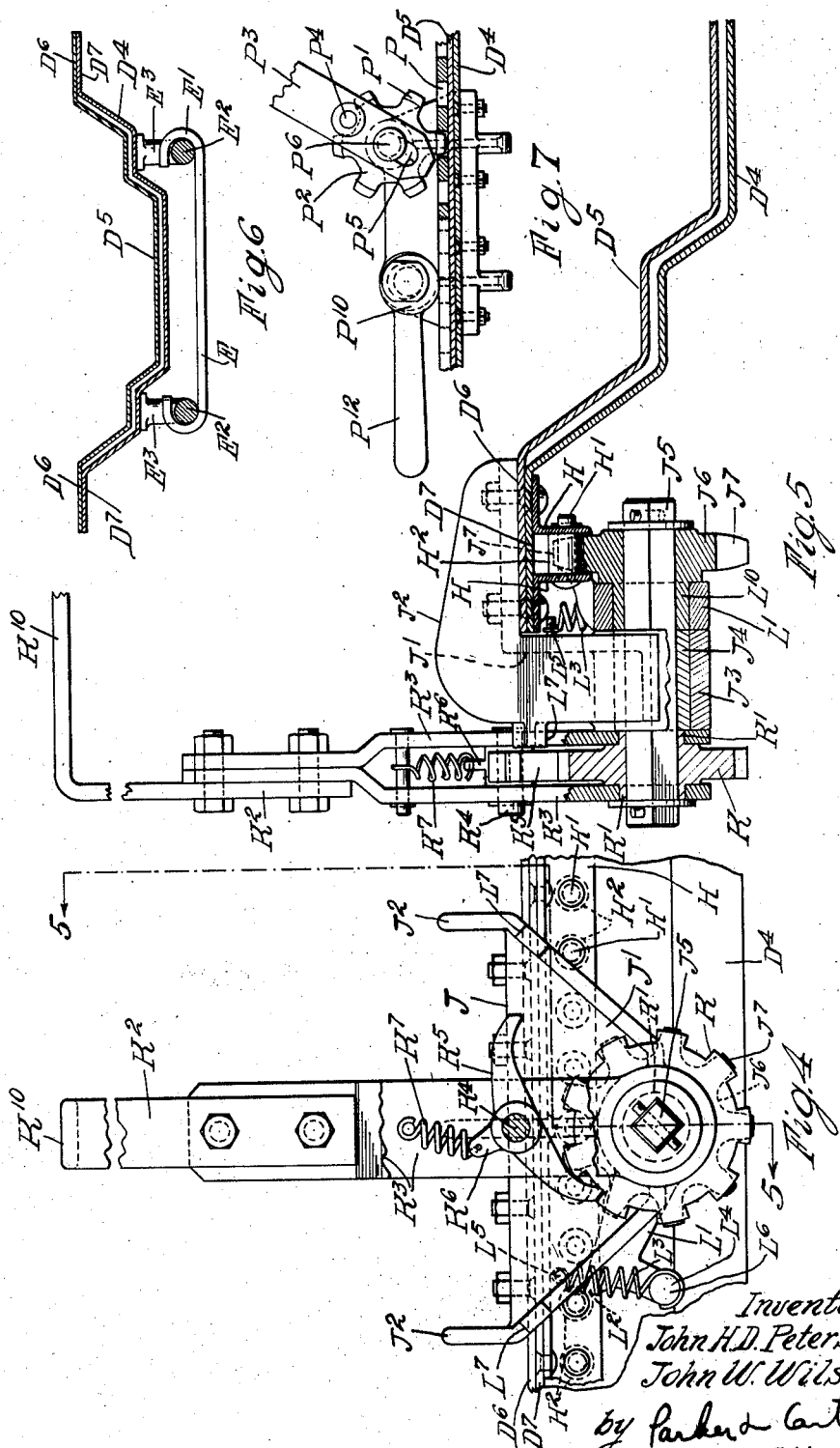

1,772,681

UNITED STATES PATENT OFFICE

JOHN H. D. PETERSEN AND JOHN W. WILSON, OF CHICAGO, ILLINOIS, ASSIGNORS TO LINK-BELT COMPANY, OF CHICAGO, ILLINOIS, A CORPORATION OF ILLINOIS

FEEDER FOR SHAKER CONVEYERS

Application filed July 12, 1926. Serial No. 121,796.

Our invention relates to a feeding device for excavating or conveying machinery and particularly to a feeder for shaker or reciprocating conveyers. One object of our invention is the provision of feeding means for use with a feeding conveyer, whereby a conveyer may automatically feed itself or pick up the material to be conveyed. Another object is the provision of a combined excavating and conveying member whereby material may be fed to a reciprocating conveyer in response to the reciprocation of the conveyer. Another object is the provision of means for extending such a conveyer and feed member, in order to permit prolonged feeding without frequent adjustment. Other objects will appear from time to time throughout the specification and claims.

We illustrate our invention more or less diagrammatically in the accompanying drawings wherein—

Figure 1 is a vertical longitudinal section of a typical conveyer;

Figure 2 is a similar section, in continuation of Figure 1, illustrating the feeding member as applied to the conveying member;

Figure 3 is a plan view;

Figure 4 is a detail of the advancing means for the feeding member;

Figure 5 is a section along the line 5—5 of Figure 4;

Figure 6 is a section along the line 6—6 of Figure 2; and

Figure 7 is a modified form of clamping and feeding means. Like parts are indicated by like characters throughout the specification and drawings.

Whereas we do not wish to limit ourselves to the particular employment of the feeding member herein shown, or to any particular conveyer, it is herein illustrated as employed with a reciprocating or shaking conveyer of the type wherein the conveyer is reciprocated in opposite directions at different speeds, for example with a slow forward movement and a rapid rearward movement. Referring for example to Figures 1 and 2, A indicates the floor and $A^1$ the roof of a mine tunnel or passage. $A^3$ is a transverse passage containing for example the tracks $A^4$ adapted to guide any suitable conveying member or car $A^5$.

B is a conveyer trough or chute which may be reciprocated for example upon the rollers $B^1$, which rest upon track members $B^2$ and support the upper track members $B^3$ upon the trough B.

C diagrammatically illustrates any suitable reciprocating means for said trough, including the crank arm $C^1$.

Referring to Figures 2 and 3, we illustrate the trough B as having secured to the forward end of the forward section the feeder member generally indicated as X. It will be understood that we may employ any suitable number of trough sections B, additional sections being inserted as the work progresses.

The securing means between the feeding member and the end of the trough B are as follows: Secured to the trough B is a yoke member D having the arms $D^1$, within which is pivoted the transverse member $D^2$. Upwardly projecting from said member $D^2$ is the vertical pin or pivot $D^3$ to which the feeding member is pivoted. It will be understood that the feeding member as a whole may rotate freely about either a vertical or a horizontal axis, there being in effect a universal connection between the conveyer trough B and the feeder X. The same securing means may also be used between any number of trough sections B as shown in Figure 3. The feeding member consists preferably of two separate troughs $D^4$ $D^5$, the upper trough $D^5$ being in slidable relation with the trough $D^4$, there being no connection between the trough $D^5$ and the conveyer B. Referring to Figure 6, which illustrates the cross section of the feeding member, the trough $D^5$ is provided with horizontal side flanges $D^6$ which engage and slide upon corresponding flanges $D^7$ upon the lower trough $D^4$. The troughs are preferably but not necessarily out of contact except along said flanges.

In order to permit lateral movement of the feeding member, for example, by rotation about the vertical pivot $D^3$ or, when such pivot arrangement is omitted, by lateral movement of the end of the conveyer as a whole, we provide a slidable supporting member consisting of the flat ground engaging shoe E having the recurved ends E¹ adapted to receive the horizontal bars E² E² mounted at opposite sides of the trough D⁴, and connected to it by the upwardly turned portions E³. It will be understood that as the conveyer as a whole reciprocates the shoe E remains fixed, the bars E² sliding across its upper surface and along the upper recurved portions E¹. When it is desired to move the conveyer laterally, the shoe E acts as a runner or sled, supporting the feeding member, holding it above the ground and permitting its lateral movement.

Assuming that the conveyer with the feeder at the end is in engagement with the material diagrammatically indicated in Figure 2 as G, the rapid forward movement of the feeding conveyer will thrust the end of the feeding member into the material. As the conveyer is slowly withdrawn, the material upon its upper surface moves with it. At the succeeding rapid reverse movement of conveyer and feeder, the feeder is again forwardly thrust into the material G and the forward movement is so rapid that the material already on the conveyer, instead of traveling rearwardly with the conveyer, holds its position, by inertia, until it is again rearwardly conveyed at the next reverse slow conveying movement.

In order to permit the feeding member to be advanced as the material accumulated is disposed of, we provide means for moving the upper trough D⁵ forwardly in relation to the lower trough D⁴. We may employ any suitable means, but an efficient means of accomplishing the result is illustrated in the structures shown in Figures 4 and 5.

Referring to these figures, upon the lower side of the flanges D⁷, we position the angle irons H H forming channels along which are spaced a plurality of pins H¹ carrying sleeves H². These sleeves may extend from end to end of the trough or for a distance equal to the desired relative maximum movement of the two troughs.

Mounted upon the flanges D⁶ of the upper trough D⁵ is the angle member J with its downwardly depending portion J¹ and the terminal reinforcing webs or flanges J² which converge at the bottom of the member J¹ and are connected to the hub member J³. Mounted for rotation in said hub J³ is the sleeve J⁴ through which passes the square shaft J⁵. At one end of said shaft is the pinion J⁶ having teeth J⁷ adapted to engage the sleeves H² which serve as ratchets.

At the opposite end of the square shaft J⁵ is positioned the notched wheel K having the outwardly projecting cylindrical portions K¹ at each side thereof. Rotating about said cylindrical portions are the forked members K³ K³, of the lever K². The members K³ are connected by any suitable transverse pin K⁴ to which is pivoted the double dog K⁵. K⁶ is a lug or lever upwardly projecting from the center of the dog K⁵ and K⁷ is a compression spring tending to hold in engagement whichever tooth or arm of the dog is in engagement with the wheel K.

Mounted on the cylindrical member L¹⁰ inwardly projecting along the square shaft J⁵ from the pinion J⁶ is the lever pawl L¹ having a terminal member L² adapted to engage the spacer sleeves H². L³ is a tension spring, one end of which is secured to the pawl as at L⁴, and the other end as at L⁵ to the member J¹, thus tending to draw the pawl clockwise into engagement with the members H². L⁶ indicates any suitable handle whereby the pawl may be withdrawn from position. L⁷ L⁷ are stops on the webs J² adapted to limit the travel in either direction of the lever K². It will be understood that the structure is duplicated in opposite sides in the troughs D⁴ D⁵, the two levers K² being connected by the cross member K¹⁰.

In order to promote the easy and rapid movement of material upon the feeding member, we provide the trough D⁵ with a laterally expanded terminal portion M, terminated in a mounted or arcuate forward edge M¹. Such edge M¹ of the upper trough D⁵ may be provided with a plurality of teeth M².

Referring to Figure 7 I illustrate a variant means for advancing the trough D⁵, with which is associated a positive locking member. The trough D⁵ is shown as carrying any suitable rack member P adapted to receive the teeth P¹ of the ratchet wheel P². P³ is the actuating lever having the transverse pin P⁴ adapted to engage the notches of the wheel P². It is provided with the slot P⁵ which receives the pivot pin P⁶ of the wheel P² and permits the lever to be upwardly moved to permit its disengagement from the wheel P². P¹⁰ is any suitable eccentric latch member controlled by the handle P¹² and adapted to thrust the drive D⁵ downwardly against the lower trough D⁴ to prevent relative movement thereof.

It will be realized that whereas we have described and shown a practical and operative device, nevertheless many changes might be made in the size, shape, number, disposition and proportion of parts without departing from the spirit of our invention. We therefore wish our drawings to be taken as in a broad sense illustrative and diagrammatic rather than as limiting us to the specific description and showing herein made. In particular we do not wish to be limited to the details of the conveyer with which our feeding member is shown or to the specific means for advancing the movable member of the feeding conveyer.

The use and operation of our invention are as follows:

Reciprocating conveyers of the type herein shown are already known in the art, namely, conveyers which may be reciprocated at different velocities in opposite directions in order to convey material fed to them. Such conveyers may be employed for many purposes and may for example be employed in mining. Such a conveyer when so employed may be advanced from a given location by the insertion of additional conveyer sections as the shaft is lengthened, all such sections forming a single conveyer, reciprocated from a single power source. The material to be conveyed may be shot down from the end of the shaft or otherwise accumulated and is generally divided into lumps and particles of varying size. We mount upon the forward end of the conveyer a feeding member which is adapted to be thrust by the forward movement of the conveyer into the pile of material to be conveyed. The slow rearward movement of the feeding member conveys away the material received upon it as a result of the rapid forward thrust. However, when large quantities of material are thus rapidly rearwardly conveyed from the working face of the shaft the face of the material available for excavation recedes. In order to permit the conveying and feeding to continue without the necessity of forwardly adjusting the conveyer we have provided the means above described for advancing the upper of the two troughs, in relation to the lower. The notched wheel K is actuated in response to movement of the lever $K^2$. Preferably we employ a pair of levers at opposite sides of the trough connected by the transverse member $K^{10}$. The lever $K^2$ engages the wheel through the dog $K^5$ which may be reversed as to direction, for example by the foot of the operator. When the trough $D^5$ is being advanced, the wheel K in response to the movement of said lever $K^2$ draws the trough forwardly along the spacers $H^2$ between the channel forming angle irons H. Rearward movement of the trough, in response to reciprocation of the conveyer, is prevented by the pawl $L^1$ which is normally upwardly drawn by the tension spring $L^3$ so that its end $L^2$ engages the spacers $H^2$. As the trough is forwardly moved the pawl overrides the spacers but prevents rearward movement of the trough. If desired we may also provide positive clamping means as shown in detail in Figure 7.

In the general operation of the device as the depth of the shaft increases the feeder is advanced. When the upper trough $D^5$ has been advanced as far as it can be, it is returned to its original position and an additional section of the conveyer is inserted, the process being continued indefinitely.

We claim:

1. The combination with a reciprocatory conveyer of a longitudinally extensible feeding means therefor comprising one member pivoted to said reciprocatory conveyer to rotate about a vertical axis and another member longitudinally movable with relation to the first, a mounted engaging supporting shoe for said first member adapted to permit lateral movement of the feeding means, and a slidable connection between said member and said mounted engaging shoe to permit the reciprocation of said member in unison with the reciprocatory conveyer.

2. The combination with a reciprocatory conveyer of a feeder therefor, comprising a material pick-up member in communication with the end of the conveyer and adapted to reciprocate therewith, and pivotally mounted for rotation, in relation to the conveyer, about a vertical axis, and a laterally extended, laterally slidable ground engaging supporting shoe for said pick-up member, in slidable relation with said pick-up member.

3. The combination with a reciprocatory conveyer of a feeder therefor, comprising a material pick-up member in communication with the end of the conveyer and adapted to reciprocate therewith, and pivotally mounted for rotation, in relation to the conveyer, about a vertical axis, and a laterally extended, laterally slidable ground engaging supporting shoe for said pick-up member, the pick-up member being freely longitudinally movable in relation therewith.

4. The combination with a reciprocatory conveyer, of a pick-up member secured thereto and adapted to move in unison therewith, a universal connection interposed between said pick-up member and said conveyer adapted to permit rotation about horizontal and vertical axes, and a material engaging terminal portion at the outer end of said pick-up member.

5. In a self-feeding conveyer, in combination, a generally horizontal conveyer trough and means for imparting to it a differential conveying reciprocation, and a digging and feeding member secured to said trough and adapted to move in unison therewith and to deliver material directly thereto, and a laterally disposed runner, positioned beneath the digging member and a longitudinally slidable connection therebetween.

Signed at Chicago, in the county of Cook and State of Illinois, this 8th day of July, 1926.

J. W. WILSON.
JOHN H. D. PETERSEN.